United States Patent [19]
Murray et al.

[11] Patent Number: 5,493,648
[45] Date of Patent: Feb. 20, 1996

[54] DISPLAY UPDATE CONTROLLER

[75] Inventors: Mark R. Murray, Atlanta; George W. Coleman, Stone Mountain, both of Ga.

[73] Assignee: Hayes Microcomputer Products, Inc., Norcross, Ga.

[21] Appl. No.: 35,974

[22] Filed: Mar. 23, 1993

[51] Int. Cl.⁶ .............................. G06F 3/00; G06F 13/00
[52] U.S. Cl. .................... 345/185; 364/DIG. 1; 364/239; 364/239.1; 364/239.6; 364/267.9; 395/164; 395/250; 395/650
[58] Field of Search .................... 395/250, 164; 364/DIG. 1, 239, 239.1, 267.9; 345/185

[56] References Cited

U.S. PATENT DOCUMENTS

| | | | |
|---|---|---|---|
| 4,443,863 | 4/1984 | Busch et al. | 364/900 |
| 4,860,193 | 8/1989 | Bentley et al. | 364/200 |
| 5,007,673 | 12/1991 | Brodegard et al. | 364/461 |
| 5,210,829 | 5/1993 | Bitner | 395/250 |
| 5,301,351 | 4/1994 | Jippo | 395/800 |

Primary Examiner—David K. Moore
Assistant Examiner—A. Katbab
Attorney, Agent, or Firm—Jones & Askew

[57] ABSTRACT

A method for detecting high speed data received by a computer and for delaying displaying the receive data, thereby increase the microprocessor time devoted to receiving and storing the input data. Three parameters are utilized for determining when updating the display should be delayed because data input speed is high. First, if the input data is close to filling the computer's receive buffer, the data input speed is high. Second, if the data input port becomes idle, no more data is being input to the computer and the display may be updated. Third, if the display has not been updated recently, as indicated by a preset timer timing out, an update of the display is forced so that the user can verify that data is successfully being input. By varying and limiting the number of display updates, the microprocessor is allocated more time to store and process received data when the data input speed demands. By improving the microprocessor's ability to store and process received data, data communications are not disrupted.

27 Claims, 2 Drawing Sheets

DISPLAY UPDATE CONTROLLER

TECHNICAL FIELD

The present invention relates to computer task management control and, more particularly, describes a task management control mechanism which detects the receipt of high speed data by a computer, which data is to be displayed on an associated display device, and increases the time devoted to receiving and storing data by decreasing time devoted to displaying the received data.

BACKGROUND OF THE INVENTION

Before the advent of high speed communications networks and complex graphic displays, the demands on microprocessor time in most general purpose computers were not great. Data input speeds were orders of magnitude less than current data input speeds. Further, during communications, the data was displayed in text mode, as graphic displays were not utilized by the computer programs that received and displayed data.

In the prior art, the computer program controlling the receipt of data would capture a character of data and immediately process and display the character. The next data character could then be received and displayed. Thus, the display was updated one character at a time. This worked fine when data was received at 300–1200 bits/second and the characters were put on the screen by a display device operating in a text mode.

However, as data input speeds increased, individually processing and displaying each character was slowing the speed at which a microprocessor could handle incoming data. Most data communications programs subsequently developed began buffering incoming characters and updating the display only after a full line of characters was received. The display would then be updated one line of data at a time. By buffering characters and updating the display less often, the available microprocessor time devoted to receiving and storing data was increased.

Alas, updating the display as each line of data is received is becoming impractical in today's high speed communications environments. Data input rates frequently range from 9600 to 25000 bits/second. Further, the increasing presence of fiber optic communications networks, and the associated increases in bandwidth and data transmission speeds, demands that computers be capable of receiving and storing this high speed data and even faster future data input rates. The microprocessor must continually receive and store this data or suffer delays in communications throughput or risk missing character interrupts.

Furthermore, it takes longer to display the received data using today's graphics mode display systems than when a text mode display is utilized. Therefore, current graphic display systems require significantly more microprocessor time than text mode displays. In a graphical interface display system, such as the Windows Operating System's Graphical Interface sold by Microsoft Corporation, all images are displayed and characters drawn in the graphics display mode. Thus, all data received by the computer is displayed using a graphic display system.

In a graphic display system, each data character received by the computer is transferred into the graphical interface software which generates the pixel data needed to display the character. In contrast to text mode displays, where transmitting one byte to a character generator produced the character to be displayed, graphic displays require that a bit be assigned to each pixel on the display and each time the display is updated every pixel on the display must be controlled. Further, color attributes, script and the size of the character must all be controlled to generate a character display. Indeed, drawing just one character frequently requires the graphical interface software to output 50 bytes of data. The microprocessor running the graphical interface software must execute all the software commands and transfer significant quantities of data just to generate one character on the display.

Therefore, the microprocessor must spend a great amount of time controlling the display of data. For example, a scroll command, which generally causes several thousand pixels to scroll upwards to make room at the bottom of the window for the new data, is very time consuming to perform. Scroll commands are common in data communications applications, as data is often received and placed on the bottom line of the display, causing the upper lines on the display to be scrolled. As can be seen, the microprocessor must service two time intensive tasks: (1) receiving and storing data, and (2) displaying the received data.

The only function served by drawing data on the display during data communications is to inform the user that data is being received in the computer. Indeed, all data received during data communication could be stored and displayed after the communication ended, thereby increasing the microprocessor time devoted to receiving data and maximizing throughput. However, the user may become confused because data would not be appearing on the screen during communications. As is known to those skilled in the art, the display of a computer should change when users believe an operation is occurring or else users believe nothing is happening in the computer. Thus, some microprocessor time must be devoted to updating the display, even though this updating process does not advance the ultimate goal of data capture.

Unfortunately, during data communications, drawing on the display may account for 50–70% of the microprocessor time, causing the microprocessor to fall behind in receiving and storing data input. This either causes a reduction in the speed of communications or else lost data.

In the past, as the data rates increased, the designers of computer programs simply buffered increasingly large data sets and updated the display less frequently and with more data. Recently, in response to today's high speed data input and the use of graphics displays, it has been suggested that one solution to avoiding overburdening the microprocessor is to buffer several lines or even pages of data input. The computer programs might buffer several lines of characters, and then perform all the display operations at one time on the buffered data. Thus, the display would be updated less frequently, but the data would still ultimately be displayed.

However, even this limited buffering of data to be displayed does not alleviate the problem of allocating sufficient microprocessor time to receiving and storing data. If data is arriving slowly, the buffer fills slowly and it takes too long to fill the buffer and update the display. Additionally, as data input speeds become ever greater, such a solution would either fail or would simply display a page of data followed by a long pause and then another page of data. Experience shows that users want more frequent updates, and thus a need exists for a system that provides updates of the display in a consistent and visibly frequent manner, yet which adjusts the number of display updates depending on data input speed.

SUMMARY OF THE INVENTION

Briefly described, the present invention is a task prioritization controller that adjusts the number of display updates to both maximize the number of display updates and minimize communication throughput delays in data received by a computer.

More particularly described, the present invention detects the data input rate to a computer and, when the data input rate indicates that the amount of data received is nearing the computer's capacity to store the data, delays updating the display. By decreasing time devoted to time consuming, non-essential operations, such as display updates, the computer's capacity to receive and store data is increased corresponding to the demand of a high data input rate.

Even more particularly described, the present invention uses various parameters indicative of the urgency of receiving and processing the incoming data for determining the number of screen updates appropriate for the then current data input speed. The parameters include; (1) the number of data characters received by the computer during a software loop in which previously received data is processed and displayed, (2) whether the data input port has entered an idle state, and (3) whether a variable time-out interval has elapsed. The first parameter detects if high speed data is being input, thereby determining whether the microprocessor needs to increase the time it devotes to receiving incoming data. The second parameter indicates that data is no longer being input to the computer, and thus the capacity to receive data need not be increased. The third parameter indicates that an unacceptably long period has elapsed since the last display update, which causes the display to be updated, thereby providing the user with feedback.

If the computer determines that the data input speed is relatively slow, the computer continues updating the display at a standard rate. On the other hand, if the data input speed increases, the computer treats the receipt and storing of data input as a priority. In this situation, the computer updates the display less frequently, thereby devoting more of the microprocessor's time to receiving and storing the high speed data. By frequently checking the above described parameters, the present invention continuously adjusts the number of display updates to match data input processing requirements. Thus, dynamic control of the allocation of the computer's microprocessor time is provided.

Therefore, it is an object of the present invention to provide an apparatus which apportions microprocessor time between the tasks of data communication and displaying data.

It is a further object of the present invention to provide a method whereby a task to be performed by a microprocessor in a computer is delayed so that the speed at which the microprocessor handles another task is increased.

It is another object of the present invention to provide an apparatus which detects the input of high speed data and displays the incoming data only when displaying the data will not cause throughput delays in data communication.

DETAILED DESCRIPTION OF DRAWINGS

Figure 1:
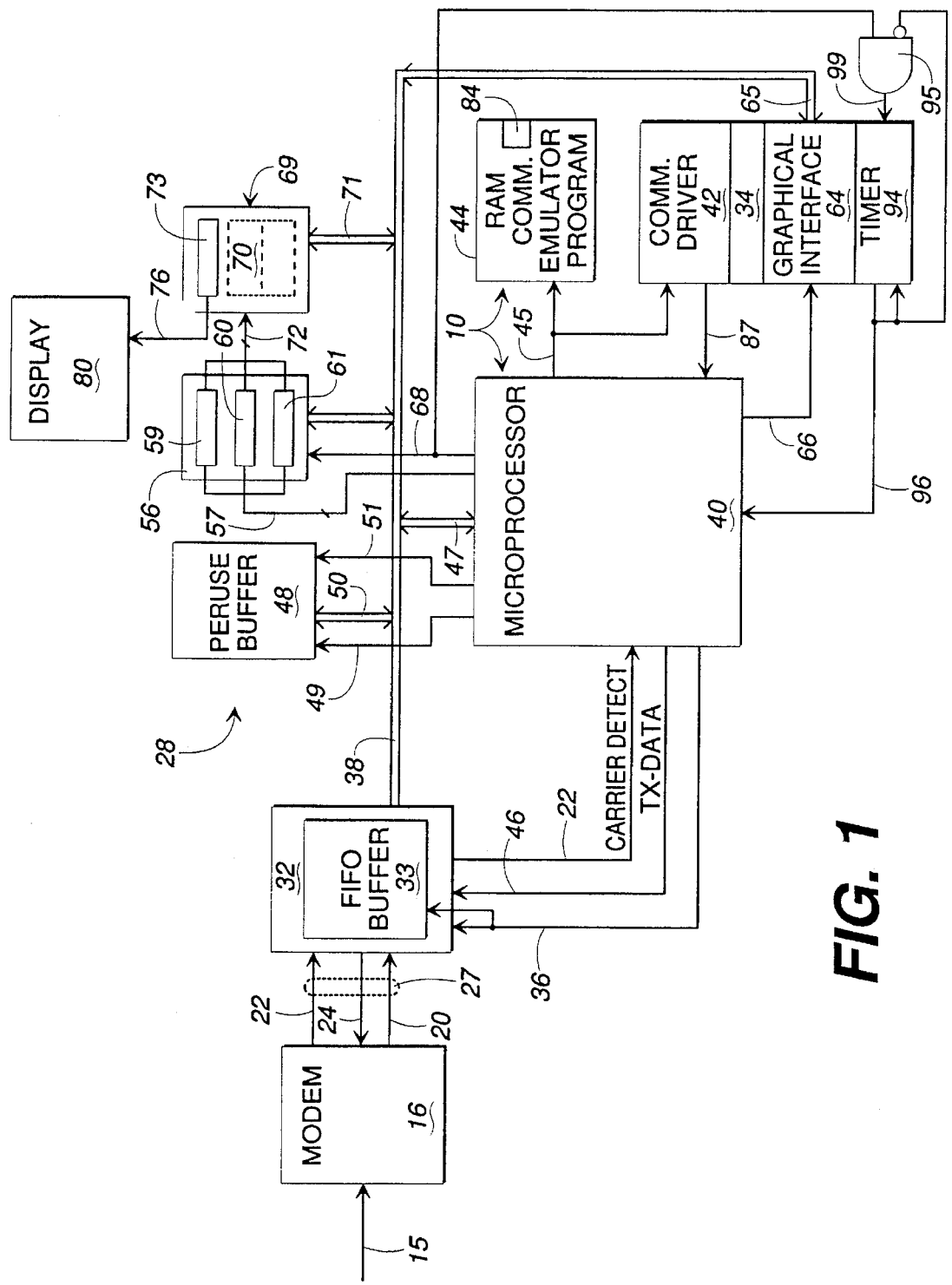
FIG. 1 is a diagram of the apparatus of the preferred embodiment of the present invention.

Turning now to the drawings, in which like numerals represent like components throughout the several figures, the preferred embodiment of the present invention will be described. FIG. 1 is a diagram of the preferred embodiment of the invention. The update controller 10 of the present invention includes a microprocessor 40 and a communications emulator program 44. The microprocessor 40 may be any type of device known as a microprocessor, controller, or central processing unit, including Intel Corp.'s 486 and Motorola Corp.'s 68030 microprocessors. Because the update controller 10 functions to adjust the time microprocessor 40 devotes to updating the display 80 depending on the microprocessor time required to process incoming data, how the computer 28 receives and stores data is first discussed.

Data terminal equipment, such as a computer 28 or a dumb terminal, is connected via a data line 20 to data communications equipment, such as a modem 16. The data bus 27 may be a serial data bus or a parallel data bus. In the preferred embodiment, data bus 27 is a serial data bus such as that specified by RS-232C or EIA-232 D. Any data input port would serve in the present invention.

Those skilled in the art will recognize that the present invention will function when interconnected with data communication networks other than the above described modem 16 and telephone system. For example, in an Integrated Services Digital Network (ISDN), synchronous digital data is transferred between computers via multiple time dimension multiplexed (TDM) channels using terminal adapters. The data transferred in an ISDN system is synchronous. The update controller 10 of the present invention will minimize throughput time of data from an ISDN link into a computer. Further those skilled in the art will recognize that the present invention could operate using any format of input data received on the parallel port (not shown ) or the serial port 27 of the computer 28.

In the preferred embodiment, as analog data on line 15 is received at the modem 16, the modem 16 indicates the presence of data by transmitting the carrier detect signal on line 22 to the computer 28. Those skilled in the art will recognize that modem 16 may be located within computer 28. The presence of this carrier detect signal on line 22 sets a flag (not shown) in the microprocessor 40 which executes a call on line 45 to both the communications driver 42 and the communications emulator program 44.

The communications driver 42, as is known to those skilled in the art, functions to control the input of data to the Universal Asynchronous Receiver/Transmitter (UART) 32 and store data in receive buffer 34. The communications driver 42 is a low level data input control program that has instructions for controlling the receipt and temporary storage of data input to the computer 28. The communications driver 42 is stored in random access memory (RAM) in the computer 28. Most, if not all, operating systems, including the Windows Operating System sold by Microsoft Corporation, have a communications driver such as driver 42 (called the COMM.DRV by Microsoft).

The communications emulator program 44 performs the more sophisticated tasks of processing the received data. As will be familiar to those skilled in the art the communications emulator program 44 contains instructions that are loaded into the computer's random access memory and transferred to the microprocessor 40 for execution during data communication. In contrast to the communications driver 42, which only controls data received by the computer 28, the communications emulator program 44 controls the processing of data through the computer 28. The communications emulator program 44 provides for and controls the display, printing or storage of data arriving on data line 20.

When data is set to enter the computer 28, the UART 32 provides an interface between the modem 16 and computer 28. The UART 32 is a device well known to those skilled in the art. Methods and apparatus for controlling UART 32 to send and receive data are known to those skilled in the art. The communications driver 42 causes the microprocessor 40 to send any communication handshaking signals, such as the data terminal ready signal on line 24, necessary to successfully transfer data into the receive buffer 34. Before transmitting the data terminal ready signal on line 24, the communications driver 42 causes the microprocessor 40 to raise the chip select signal on line 36 for the UART 32 and the first in/first out (FIFO) buffer 33 that is within UART 32. As will be recognized by those skilled in the art, FIFO buffer 33 stores only one byte of data, although larger buffers may be utilized. The computer 28 is now ready to accept data.

Data received by the computer 28 is captured and temporarily stored in the FIFO buffer 33. The communications driver 42 collects each byte captured in FIFO buffer 33 and transfers the data into receive buffer 34. The receive buffer 34 is a serial input, parallel output random access memory (RAM) device, dedicated by the communications driver to storing incoming data. Setting transmit data signal on line 46 causes the FIFO buffer 33 in UART 32 to output the data. Those skilled in the art will recognize that the data transferred from the FIFO buffer 33 to the receive buffer 34 on data bus 38 is processed by the communications driver 42. The receive buffer 34 may be embodied by any form of memory device, such as DRAM, RAM, disk or tape.

The communications emulator program 44 controls the communications driver 42 by setting the maximum number of bytes the communications emulator program 44 will input from the receive buffer 34. Communications driver 42 can increase or decrease the size of the receive buffer 34 accordingly, utilizing the computer's available random access memory RAM (not shown). Of course, other memory storage devices may be utilized to expand the size of the receive buffer 34 and temporarily store data.

In the preferred embodiment, the communications emulator program 44 will input a maximum of 1000 bytes. This causes the communications driver 42 to adjust the number of bytes of data the receive buffer 34 will store.

Under the control of the communications emulator program 44, the data accumulated in the receive buffer 34 is periodically moved to the microprocessor 40. The communications emulator program 44 logically organizes the data by forming linked lists of data which are stored in the peruse buffer 48. The communications emulator program 44 detects all line feed commands in the data stream and organizes the data into blocks in the peruse buffer 48, each block containing one line of data. Each line of data is stored in a portion of peruse buffer 48, and each line contains the address of the next block of data in the peruse buffer 48, thereby forming the linked list storage of data familiar to those skilled in the art.

The linked list data is sent from the microprocessor 40 to the peruse buffer 56 on data bus 50. The peruse buffer 48 is a section of the computer's random access memory that the communications emulator program 44 dedicates to storing incoming data received during communications in preparation for transferring the received data to the display 80.

The linked list structure of data storage, created by the communications emulator program 44 and stored in the peruse buffer 48, contains the data to be displayed in the proper format for display. The peruse buffer 48 stores that data that will be displayed, and is not intended to be long term storage for all data input to the computer 28. Those skilled in the art will recognize that other data structures may be used for storing data in the peruse buffer 48, and that the peruse buffer 48 is, logically, a video terminal emulator familiar to those skilled in the art.

In most communications emulator programs, such as emulator 44, received data is displayed as soon as possible after it is received so that the user is informed that the data has been successfully captured and stored. To update the display 80, data is transferred from the peruse buffer 48 to the graphical interface 64, and from the graphical interface 64 into display memory 69. The graphical interface 64 inputs the data and generates the bit-map necessary to display the data. The pixels necessary to draw the data, and other information such as color control and antialiasing is output to the display memory 69. In the preferred embodiment, the graphical interface 64 is the Windows Graphical Interface System made by Microsoft Corporation. Those skilled in the art will recognize that other graphics controllers/font generators may be used in embodiments of the present invention.

The output of data on line 76 from display memory 69 to display 80 is controlled by the display driver 56. The display driver 56 is controlled by signals on lines 57 from the microprocessor 40. As will be familiar to those skilled in the art, the communications emulator software 44 provides control commands on lines 57 to the display driver 56, including control commands that are stored in registers 59, 60 and 61 in the display driver 56. The value placed in the "horizontal total register" 59 is the total of the displayed characters plus the non-displayed character times (retrace) minus one, the value placed in the "vertical displayed register" 60 assists in determining the number of character rows, and the value placed in the "start address register" 61 determines which portion of display memory 69 is visible on display 80. The commands on lines 72 are transferred to the display memory 69 to control the display of data on display 80. Those skilled in the art will recognize that many control commands on lines 57, in addition to those listed above, are provided.

In the preferred embodiment, the display memory 69 is implemented using 64 kilobytes of random access memory (RAM), although larger size RAM may be utilized. Those skilled in the art will recognize that the display memory 69 must be periodically accessed to refresh the display 80, and also must be accessible to place newly received data in the display 80. To address both these demands, multiport video RAM, which includes a parallel load port 71 and serial output port 76 has been developed. Multiport video RAM is widely available from various vendors, such as the Texas Instruments Company of Dallas, Tex. Display memory 69 supports the function of refreshing the display 80 by outputting serial bits of data to the display 80 from serial register 73. Additionally, the display memory 69 may be simultaneously accessed on data bus 71 for adding new data to the display 80. Data bus 71 allows the input of data from the peruse buffer 48 into display memory 69.

The memory addressing in the RAM may be configured in a variety of ways, such as in 4 pages of 16 kilobytes of data or 2 pages of 32 kilobytes of data, as is shown in FIG. 1. The start address register 61 controls which portion of the display memory 69 is currently visible on display 80. The currently displayed portion of display memory 69 is called active memory 70 herein.

The output of display memory 69 on line 76 provides the images that appear on the display 80. In graphics mode, each bit in active display memory 69 corresponds to a pixel on the display 80. Therefore, the image to be displayed must be drawn into display memory 69. To draw the image, the microprocessor 40 must turn on or off all the bits that correspond to the pixels in the desired image. To further complicate matters, complex algorithms, such as antialiasing to smooth the edges of curved figures and color shading, may also be required or desired. The display 80 is a raster scanned cathode ray tube display, well known to those skilled in the art. Other types of displays may be utilized in embodiments of the present invention.

The communications emulator program 44, like most computer programs, causes the microprocessor 40 to continually loop through a series of instructions. When data is being received, the communications emulator program 44 continually loops through the procedure of getting data from the receive buffer 34, processing and storing the data in the peruse buffer 48, and moving the data to display memory 69, which causes the display of the data. To keep up with the incoming data, the communications emulator program 44 must get data from the receive buffer 34, process and store the data in the peruse buffer 48, transfer the data to the display memory 69, display the data, and return to unload the receive buffer 34 before the receive buffer 34 overflows. If the receive buffer 34 becomes full before it can be emptied by the communications emulator program 44, the communications driver 42 sets the data terminal ready signal on line 24 low and no more data enters the computer 28. Additionally, data entering the computer 28 after the receive buffer is full is lost. Thus, most communications drivers 42 will set data terminal ready signal on line 24 low when the receive buffer 34 is getting close to being full. This helps prevent the loss of data, but also interrupts communications more frequently. When the data bus 27 is turned off because the receive buffer 34 is full or almost full, the computer 28 is said to have entered flow control state. Thus, communications are ceased until the communications emulator program 44 can unload the receive buffer 34. The present invention addresses the common situation where the communications emulator program 44 is in danger of not being able to gather, process and display incoming data as fast as the data is being received and stored.

It is important to recognize the distinction between; (1) transferring data from the receive buffer 34 to the microprocessor 40 and into the peruse buffer 48, and (2) transferring data from the peruse buffer 48 to the display memory 69. The first task formats the data into lines appropriate for display and stores the data in the peruse buffer 48. This task requires relatively little microprocessor time.

The second task, transferring the data from the peruse buffer 48 to the display memory 96, requires extensive microprocessor time. In graphics-interface systems, each character is transferred from the peruse buffer 48 into the graphical interface 64 on data input/output bus 65. In the preferred embodiment, the graphical interface 64, provided by the Windows Operating System sold by Microsoft Corporation, inputs each character and outputs the data necessary to draw that character on the display 80. Data is input to the graphical interface 64 and a "DrawCall" or "TextOut" order is given by the communications emulator program 44 to the graphical interface 64. Further, information concerning the location of the data on the display 80 and attributes of the data are provided by the communications emulator program 44 to the graphical interface 64. Each character drawn requires calculation of what pixels need to be turned "on" or "off" to generate the character and control of as many bits as there are individual pixels on the display 80. Color attributes, script and other information associated with graphics-interface systems must be output by the graphical interface 64. In total, it is not unusual to transfer forty to fifty bytes of information from the graphical interface 64 in order to create just one character on the display 80. The data output by the graphical interface 64 is transferred to the display memory 69 on data bus 71.

The process of updating the display 80 by transferring data from the peruse buffer 48 through the graphical interface 64 and into display memory 69 is called "rendering" or "drawing" the display 80, because the data stored in display memory 69 is seen on the display 80. Rendering the display 80 can utilize 50–70% of the microprocessor's time during data communications. Thus, sometimes only 30% to 50% of the microprocessor's time is available for the tasks of receiving and storing data. While the microprocessor 40 is rendering the display 80, the receive buffer 34 may receive more data than it can store. As stated earlier, in this case, data is either lost or the communications driver 42 enters flow control and prohibits further data input by setting the data terminal ready signal on line 24 low.

The present invention serves to delay updating the display 80 when the data input rate exceeds a preselected speed, thereby permitting the microprocessor 40 to spend more time receiving, storing and displaying data. Further, the display update controller 10 continually adjusts the number of display updates to correspond to the time requirements for receiving data.

Figure 2:
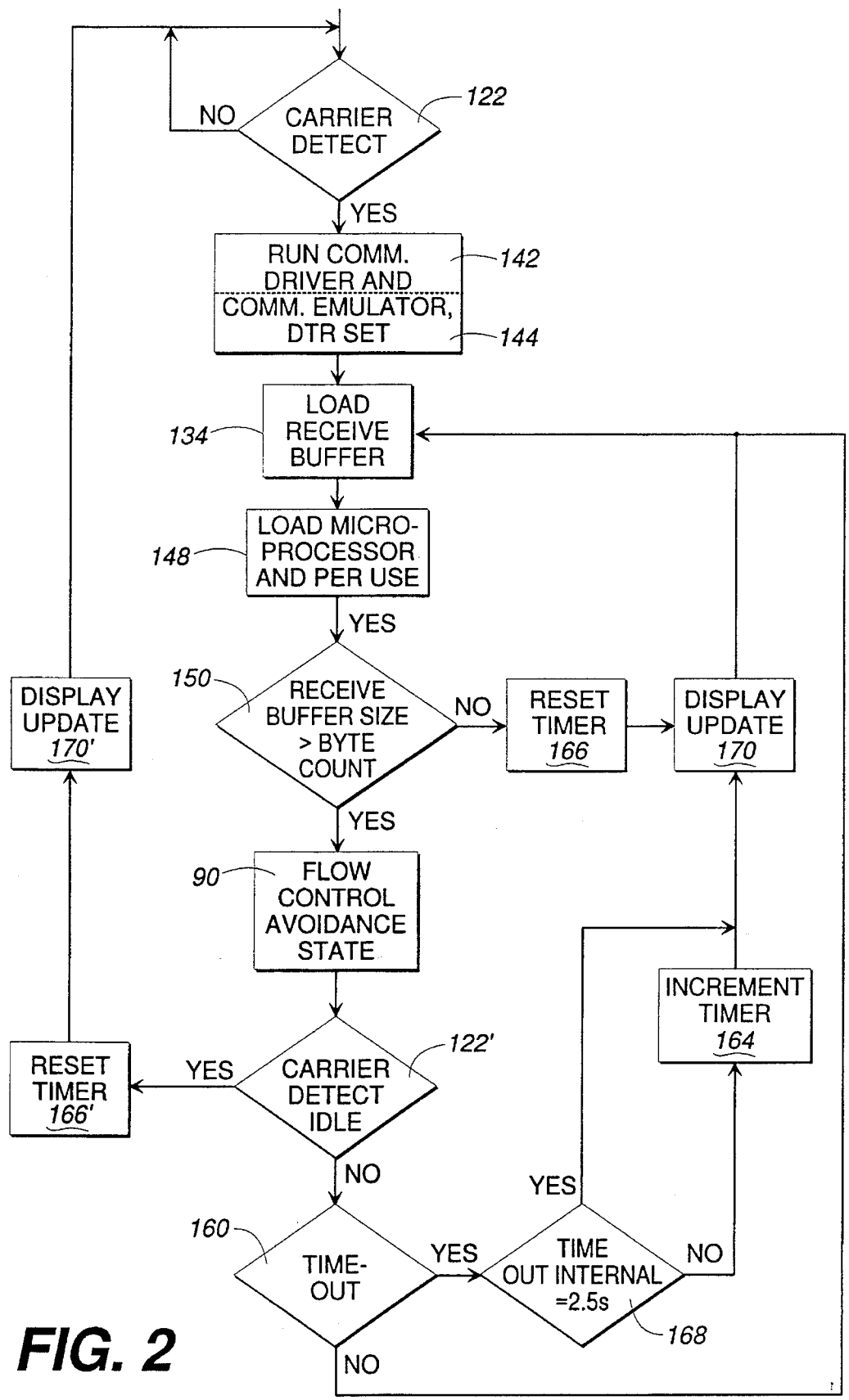
FIG. 2 is a flow chart of the preferred embodiment of the control sequence of the present invention.

Turning to the flow chart in FIG. 2, the operation of the preferred embodiment of the display update controller 10 is set forth. Input of the carrier detect signal on line 22 causes a flag in the microprocessor 40 to be set, and the carrier detect test 122 branches to "yes". Because data will soon be received, the communications driver 42 and communications emulator program 44 are called and executed. At step 134, the receive buffer 34 is loaded with received data. At step 148, the data in receive buffer 34 is transferred into microprocessor 40 and stored in the peruse buffer 48.

The number of bytes of data stored in the receive buffer is counted by the communications driver 42 and transferred to microprocessor 40 every time data is transferred from the receive buffer 34 to the microprocessor 40. The number of characters stored in the receive buffer (the "byte count") is stored in register 84 in the communications emulator program 44. Most UART's 32 generate a character input signal every time a character is received, and the communications emulator program 44 just counts these signals to get the byte count value that is ultimately stored in register 84. The number of bytes in the receive buffer is transferred to the microprocessor 40 and register 84 on line 87. The byte count value stored in register 84 may be calculated by any number of hardware or software means for counting the number of data characters on a data bus 24, commonly known to those skilled in the art.

The byte count value in register 84 represents the number of data characters currently stored in the receive buffer 34. Because the microprocessor 40 unloads the receive buffer 34 regularly, if the value in register 84 increases, the data input rate into the computer 28 has increased. Therefore, the number of data characters stored in the receive buffer 34 is indicative of the speed of flow of data into the computer 28. Those skilled in the art will recognize that other means for calculating the data input rate could be utilized, and that the time at which the number of bytes of data in the receive buffer is counted or calculated could be changed.

After the data has been transferred from the receive buffer 34, through the microprocessor 40 and into the peruse buffer 48, the byte count value in register 84 and a preselected value 86 are compared at step 150 (FIG. 2). The preselected value 86 is stored in the communications emulator program 44.

In comparison step 150, if the value in register 84 is less than preselected value 86, the computer 28 does not alter its standard display operations because the receive buffer 34 is not near overflow. Conversely, if the value in register 84 is greater than preselected value 86, the computer 28 enters "flow control avoidance" in step 90, where data communications is given priority over updating the display 80. Thus, the higher preselected value 86, the higher the data input speed must be for "flow control avoidance" to be initiated. Entering flow control avoidance at step 90 indicates that high speed data is being received. Step 122' is entered following step 90.

In the preferred embodiment, the comparison step 150 is accomplished using the compare registers function in the microprocessor 40. The preselected value 86 is chosen by the programmer to indicate the number of data bytes in the receive buffer 34 that represent a high speed data input situation. In the preferred embodiment, the preselected value 86 equals 90% of the size of the receive buffer 34. Increasing the preselected value 86 increases the data input speed needed to enter the flow control avoidance. Conversely, decreasing the preselected value 86 decreases the data input speed required to cause the communications emulator program 44 to enter the flow control avoidance state. Of course, as stated above, the size of the receive buffer 34 and the preselected value 86 may be changed by the designer of the system.

If the microprocessor 40 enters the "flow control avoidance state" at step 90, data is transferred from the receive buffer 34 to the peruse buffer 48, but the display memory 69, and hence the display 80, may not be updated. After entering the flow control avoidance state at step 90, the display 80 is only updated if:

1) the byte count value in register 84 is less than the preselected value 86 at comparison step 150, 2) the carrier detect signal at step 122' is idle, indicating no more data is being input, or 3) a variable time interval has elapsed at step 160.

Under the control of the communications emulator program 44, the microprocessor 40 executes the above sequence of steps to determine if the data input speed warrants entering flow control avoidance. Condition one, comparison of the value in register 84 and the preselected value 86, is designed to determine if the receive buffer 34 is close to full, indicating that high speed data is entering the computer 28. If comparison test 150 produces a negative result, high speed data is not entering the computer. Therefore, the timer 94 is reset at step 166, an update display at step 170 is executed and the microprocessor 40 returns to step 122.

Condition two provides a method for withdrawing from flow control avoidance when the carrier detect signal on line 22 at step 122' is found to be idle. If at step 122' the carrier detect signal on line 22 is idle, no more data is present on the data bus 27 (FIG. 1). Therefore, the timer 94 is reset at step 166 and a display update at step 170' is executed. However, if at step 122' the carrier detect signal on line 22 is not idle, data is still incoming. If data is still being received, the communication emulator program 44 proceeds to step 160.

Condition three, the time-out test at step 160, provides feedback to the user by forcing a display update at step 170 when the computer 28 is engaged in high speed communications for a long period of time. As seen in FIG. 1, a timer 94 indicates the length of time which has expired since the most recent display update at step 170. The timer 94 begins running when data initially enters the computer 28, as indicated by the data terminal ready signal on line 24 being set at step 144. Thus, the timer 94 tracks the time since the most recent display update at steps 170 or 170'. Timer 94 counts down from a preselected time until it is reset or expires.

The timer 94 is reset at step 166 only when a display update 170 is caused either by: (1) comparison at step 150, in which the value in register 84 is less than preselected value 86, or (2) at step 122', in which the carrier detect signal on line 22 is idle. In both cases, the data input rate has slowed or stopped, meaning that the timer 94 can be reset at step 166 to its shortest time-out interval of 250 milliseconds. Those skilled in the art will recognize that other time-out intervals may be used.

If high speed data is being received by the computer 28 for a long period of time, the only display updates at step 170 caused are a result of the time-out decision 160. After a time-out at step 160, the time-out interval is tested at step 168 to determine if the time-out interval equals 2.5 seconds. If the time-out interval at step 168 equals 2.5 seconds, the time-out interval is left at 2.5 seconds, a display update at step 170 is forced and the microprocessor 40 returns to step 134, loading the receive buffer 34. If the time-out interval at step 168 is less than 2.5 seconds, the timer 94 is incremented by 150 milliseconds at step 164, a display update at step 170 is forced and the microprocessor 40 returns to step 134.

The display update controller 10 thus adjusts the frequency of display updates at step 170. If high speed data is received for a long period of time, the time between display updates at step 170 is incrementally lengthened up to 2.5 seconds. This feature permits increased allocation of microprocessor time to receiving and storing data while gradually getting the user adjusted to fewer updates of the display. The timer is reset at step 166 to its initial count of 250 milliseconds in the preferred embodiment only when: (1) the carrier detect signal 22 at step 122' indicates that the computer 28 is no longer receiving data, or (2) the value in register 84 is less than the preselected value 86.

The above operation is implemented in FIG. 1 using AND gate 95. If the display update signal on line 68 goes high and the time-out signal on line 96 remains low, AND gate 95 outputs a high signal on line 99 and the timer 94 is reset to 250 milliseconds. As set forth above, this reset of timer 94 occurs when the carrier detect signal on line 22 goes idle or the value in register 84 is less than the preselected value 86. If display update signal on line 68 goes high and the time-out signal on line 96 is also high, AND gate 95 output on line 99 is low and the timer 94 is not reset to 250 milliseconds. Rather, if the time-out is caused by expiration of timer 94, the period of timer 94 is incremented by 150 milliseconds, not reset to 250 milliseconds. When the time-out signal on line 96 goes high and AND gate 95 output on line 99 stays low, the timer is incremented 150 milliseconds, unless the time-out interval equals 2.5 seconds. The time-out interval is not incremented if it equals 2.5 seconds.

In the preferred embodiment, the communications emulator program 44 utilizes the public clock function, provided in the Windows Operating System sold by Microsoft Corporation, for the timer 94. The communications emulator program 44 simply inputs the time, using the Windows public clock, at which data first arrives, as indicated by the data terminal ready signal 24. The communications emulator program 44 checks the public clock after each transfer of data from the receive buffer 34 to the peruse buffer 48, and if the time-out interval has expired (FIG. 2, step 160), timer 94 outputs the time-out signal on line 96 (FIG. 1). The time-out signal on line 96 causes the update display signal on line 68 to go high, which transfers data from the peruse buffer 48 to the graphical interface 64 and to display memory 69.

Those skilled in the art will recognize that many different types of timers 94, software and hardware, would function equally well in embodiments of the present invention. Indeed, a dedicated hardware timer could be utilized. However, because of the common availability of timers in the operating systems that run on most personal computers, building such a timer is considered unnecessary.

The preferred embodiment is implemented on an International Business Machines personal computer, or a personal computer compatible therewith, using the Windows Operating System sold by Microsoft Corporation. However, those skilled in the art will recognize that many types of computers and operating systems can utilize the present invention with little or no variation.

Those skilled in the art will recognize that the display update controller 10 of the present invention may be implemented without using the timer 94 or the carrier detect signal on line 22. In that situation, flow control avoidance at step 90 of FIG. 2 would be entered and exited based strictly on whether the value in register 84 is greater than preselected value 86 at comparison step 150. Although such a device would not provide all the advantages of the present invention, it would still be within the scope and spirit of this invention.

From the above, it will be appreciated that the present invention provides an apparatus that allocates and prioritizes microprocessor time between receiving data from a communications network and displaying that data. From the detailed descriptions and accompanying drawings numerous modifications, alterations, and alternative embodiments of the present invention will become apparent to those skilled in the art. Therefore, the present invention is to be limited only by the claims below and equivalents thereof.

We claim:

1. In a computer receiving data at a data input port, and including first memory storage means, second memory storage means, a controller, display memory and a display, a method for controlling the transfer of the received data to said display memory comprising the steps of:

(a) loading said data in said first memory storage means;

(b) periodically transferring said data stored in said first memory storage means to said second memory storage means;

(c) counting the number of bytes of data transferred from said first memory storage means to said second memory storage means and thereby producing a byte count value;

(d) comparing said byte count value to a preselected value and delaying transfer of said data from said second memory storage means to said display memory when said byte count value is greater than said preselected value.

2. The method of claim 1 wherein said preselected value is between 80–95% of the size of said first memory storage means.

3. In a computer receiving data at a data input port, and including first memory storage means, second memory storage means, a controller, display memory and a display, a method for controlling the transfer of data to said display memory comprising the steps of:

(a) loading said data in said first memory storage means;

(b) periodically transferring said data stored in said first memory storage means to said second memory storage means;

(c) counting the number of bytes of data transferred from said first memory storage means to said second memory storage means and thereby producing a byte count value;

(d) determining if data is being received at said data input port;

(e) comparing said byte count value to a preselected value and delaying transfer of said data from said second memory storage means to said display memory when said byte count value is greater than said preselected value and data is being received at said data input port.

4. The method of claim 3 wherein said preselected by count is between 80–95% of the size of said first memory storage means.

5. The method of claim 3 wherein the step of determining if data is being received at said data input port is performed every time data stored in said first memory storage means is transferred to said second memory storage means.

6. The method of claim 3 wherein a carrier detect signal connected to said controller is utilized to determine if data is being received at said data input port.

7. In a computer receiving data at a data input port, and including first memory storage means, second memory storage means, a controller, a timer, display memory and a display, a method for controlling the transfer of the data to said display memory comprising the steps of:

a) loading said data in said first memory storage means;

(b) periodically transferring said data stored in said first memory storage means to said second memory storage means;

(c) counting the number of bytes of data transferred from said first memory storage means to said second memory storage means and thereby producing a byte count value;

(d) determining if data is being received at said data input port;

(e) causing said timer to determine the time expired since the most recent update of the display memory using data transferred from said second memory storage means;

(f) comparing said byte count value to a preselected value and delaying transfer of said data from said second memory storage means to said display memory when said byte count value is greater than said preselected value, data is being received at said data input port, and a predetermined time period has not expired on said timer.

8. The method of claim 7 wherein said preselected value is between 80–95% of the size of said first memory storage means.

9. The method of claim 7 wherein the data in said second memory storage means is transferred to said display memory when a predetermined time period has expired on said timer during which time period said display memory has not been updated.

10. The method of claim 9 wherein said predetermined time period on said timer is adjustable, said time period increasing after subsequent to each timer period in which said display has not been updated and said timer has expired.

11. The method of claim 7 wherein a carrier detect signal connected to said controller is utilized to determine if data is being received at said data input port.

12. A display update controller, comprising:

a data input port;

a first memory storage device, for storing data received at said input data port;

a second memory storage device for storing data transferred from said first memory storage device;

a display memory connected to said second memory storage device for storing data that is being displayed; and a controller periodically;
  (a) transferring data from said first memory storage device to said second memory storage device;
  (b) determining the number of bytes of data stored in said first memory storage device;
  (c) comparing the number of bytes of data in said first memory storage device to a preselected value;
  (d) not transferring said data from said second memory storage device to said display memory when said number of bytes of data in said first memory storage is greater than said preselected value.

13. The display update controller of claim 12, including a data input detect signal connecting said controller and said data input port, said data input detect signal indicating the presence of data arriving at said data input port, wherein an update display signal goes high when said data input detect signal indicates that no data is currently being received at the data input port, thereby causing the update of said display memory using the data stored in said second memory storage device.

14. The display update controller of claim 12, including a timer, wherein said timer produces a time-out signal upon passage of a predetermined time-out period during which data is being received at said data input port and no update of said display memory has occurred, said time-out signal causing the update of said display memory.

15. The display update controller of claim 14 wherein said timer has a time-out period that is lengthened after each expiration of said timer.

16. The display update controller of claim 15 wherein said time-out period is adjusted as follows:

a) said time-out period is initially set to a predetermined length;

b) said time-out period is incrementally lengthened after each expiration of said timer, until said time-out period equals a limiting length whereupon said time-out period remains at said limiting length;

c) said time-out period is reset to said predetermined length when data is not being received at said data input port; and d) said time-out period is reset to said predetermined length when said number of bytes of data in said first memory storage device is less than said preselected value.

17. A display update controller, comprising:

a data input port;

a first memory storage device, for storing data received at said input data port;

a second memory storage device for storing data transferred from said first memory storage device;

display memory connected to said second memory storage device for storing data that is to be displayed;

a timer, wherein said timer measures the time expired since the most recent update of said display memory using the data in said second memory storage device; and a controller periodically;
  (a) transferring data from said first memory storage device to said second memory storage device;
  (b) determining the number of bytes of data in said first memory storage device;
  (c) comparing the number of bytes of data in said first memory storage device to a preselected value;
  (d) not transferring said data from said second memory storage device to said display memory when said number of bytes of data in said first memory storage device is greater than said preselected value, data is being received at said data input port and said timer has not expired.

18. In a computer receiving data, the computer including first memory storage means for storing data input, second memory storage means, a controller, display memory and a display device, a display update controller, comprising;

means for loading said data into said first memory storage means when said data is received by said computer;

means for transferring said data from said first memory storage means to said second memory storage means;

means for detecting the number of bytes of data stored in said first memory storage means;

means for transferring said data from said second memory storage means to said display memory; and controller means for delaying updating said display memory with said data from said second memory storage means when the number of bytes of data located in said first memory storage means is greater than a preselected value.

19. The display update controller of claim 18 wherein said controller periodically determines the number of bytes of data stored in said first memory storage means and outputs a display update signal to said display memory only when the number of bytes of data located in the first memory storage means is less than a preselected value.

20. The display update controller of claim 19 wherein said preselected value is between seventy-five and ninety-five percent of the capacity of said first memory storage means.

21. The display update controller of claim 18 wherein said display memory includes means for storing electronic signals that represent the image to be displayed, and the controller controls the output of said electronic signals to said display in conjunction with a display driver.

22. In a computer receiving data, the computer including first memory storage means for storing data input, second memory storage means, a controller, display memory and a display device, a display update controller, comprising:

means for loading said data into said first memory storage means when said data is received by said computer;

means for transferring said data from said first memory storage means to said second memory storage means;

means for detecting the number of bytes of data stored in said first memory storage means;

means for transferring said data from said second memory storage means to said display memory; and controller means for delaying updating said display memory when the number of bytes of data stored in said first memory storage means is greater than a preselected value and when data is being received by said computer.

23. The display update controller of claim 22 wherein said controller periodically determines the number of bytes stored in said first memory storage means and delays outputting a display update signal to said display memory when the number of bytes of data located in the first memory storage means is greater than a preselected value and data is being received at said data input port.

24. In a computer receiving data, the computer including first memory storage means for storing data input, a controller, display memory, a display device and a timer for determining the time period since the display was last updated, a display update controller, comprising:

means for detecting when data is being received at said data input port;

means for loading said data into said memory storage means when said data is received by said computer;

means for transferring said data from said first memory storage means to said second memory storage means;

means for detecting the number of bytes of data stored in said first memory storage means;

means for transferring said data from said second memory storage means to said display memory; and controller means for delaying updating said display memory when the number of bytes of data stored in said first memory storage means is greater than a pre-selected value, data received at said data input port has not stopped, and said timer has not expired, thereby permitting said controller to spend more time transferring said data from said first memory storage means to said second memory storage means.

25. The display update controller of claim 24 wherein the means for detecting when data is being received at said data input port is a carrier detect signal.

26. The display update controller of claim 24 wherein said timer time-out interval is adjustable.

27. The display update controller of claim 26 wherein said time-out interval is lengthened after each timer time-out.

* * * * *